US012668097B2

(12) United States Patent
Nakayama et al.

(10) Patent No.: US 12,668,097 B2
(45) Date of Patent: Jun. 30, 2026

(54) AIR-CONDITIONING CONTROL DEVICE AND COMPUTER-READABLE RECORDING MEDIUM

(71) Applicant: TOYOTA JIDOSHA KABUSHIKI KAISHA, Toyota (JP)

(72) Inventors: Shigeki Nakayama, Gotenba (JP); Tomohiro Kaneko, Mishima (JP); Kotoru Sato, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/375,613

(22) Filed: Oct. 2, 2023

(65) Prior Publication Data

US 2024/0131895 A1    Apr. 25, 2024
US 2024/0227496 A9    Jul. 11, 2024

(30) Foreign Application Priority Data

Oct. 21, 2022    (JP) ................................. 2022-169419

(51) Int. Cl.
B60H 1/00 (2006.01)

(52) U.S. Cl.
CPC ............................... B60H 1/00742 (2013.01)

(58) Field of Classification Search
None
See application file for complete search history.

(56) References Cited

U.S. PATENT DOCUMENTS

| | | | |
|---|---|---|---|
| 11,279,204 B2 * | 3/2022 | Youn ................... | B60H 1/00821 |
| 2020/0180396 A1 * | 6/2020 | Youn ................... | B60H 1/00821 |
| 2020/0242421 A1 * | 7/2020 | Sobhany ............... | G06N 20/00 |
| 2020/0269653 A1 * | 8/2020 | Rakshit .............. | B60H 1/00742 |
| 2021/0078382 A1 * | 3/2021 | Maeng ................. | A61B 5/01 |
| 2021/0221399 A1 * | 7/2021 | Goto ................. | B60W 60/0013 |

FOREIGN PATENT DOCUMENTS

| | | | | |
|---|---|---|---|---|
| JP | 2006-282084 A | 10/2006 | | |
| JP | 2016-137200 A | 8/2016 | | |
| JP | 2018-135085 A | 8/2018 | | |
| WO | WO-2018179631 A1 * | 10/2018 | ............... | A61B 5/18 |
| WO | WO-2020195499 A1 * | 10/2020 | ......... | B60H 1/00742 |

* cited by examiner

*Primary Examiner* — Peter D Nolan
*Assistant Examiner* — Matthew Cobb
(74) *Attorney, Agent, or Firm* — Dinsmore & Shohl LLP

(57) ABSTRACT

An air-conditioning control device includes a processor comprising hardware, the processor being configured to execute: estimating an emotion of an occupant in a vehicle interior when a spot air conditioning is performed on the occupant; and controlling the spot air conditioning based on an estimation result.

18 Claims, 3 Drawing Sheets

AIR-CONDITIONING CONTROL DEVICE AND COMPUTER-READABLE RECORDING MEDIUM

CROSS-REFERENCE TO RELATED APPLICATIONS

The present application claims priority to and incorporates by reference the entire contents of Japanese Patent Application No. 2022-169419 filed in Japan on Oct. 21, 2022.

BACKGROUND

The present disclosure relates to an air-conditioning control device and a computer-readable recording medium.

JP 2018-135085 A discloses a technique for performing spot air conditioning on an occupant of a vehicle when a predetermined spot air conditioning condition is satisfied.

SUMMARY

In JP 2018-135085 A, for example, a learned model can be created by machine learning, and an air-conditioning control can be performed using the learned model. However, a demand for an air conditioning of the vehicle depends on how the occupant feels at that time, and there are cases where the control that does not reflect a feeling of the occupant is not comfortable. Therefore, there has been a demand for an air-conditioning control that reflects the feeling of the occupant.

There is a need for an air-conditioning control device and an air-conditioning control program capable of performing an air-conditioning control reflecting a feeling of an occupant.

According to one aspect of the present disclosure, there is an air-conditioning control device including a processor comprising hardware, the processor being configured to execute: estimating an emotion of an occupant in a vehicle interior when a spot air conditioning is performed on the occupant; and controlling the spot air conditioning based on an estimation result.

According to another aspect of the present disclosure, there is a non-transitory computer-readable recording medium with an executable program stored thereon. The program causes a processor to execute: estimating an emotion of an occupant in a vehicle interior when a spot air conditioning is performed on the occupant; and controlling the spot air conditioning based on an estimation result.

The above and other features, advantages and technical and industrial significance of this disclosure will be better understood by reading the following detailed description of embodiments of the disclosure, when considered in connection with the accompanying drawings.

DETAILED DESCRIPTION

An air-conditioning control device and an air-conditioning control program according to an embodiment of the present disclosure will be described with reference to the drawings. Incidentally, constituent elements in the following embodiments include those that can be easily replaced by a person skilled in the art or those that are substantially the same.

Air-Conditioning Control Device

An air-conditioning control device 1 is for controlling an air-conditioning device (air conditioner) of a vehicle. The air-conditioning control device 1 may be mounted on a vehicle, or may be realized by a server device different from the vehicle. The present embodiment will be described on an assumption that the air-conditioning control device 1 is mounted on the vehicle. Further, although the air conditioner has a cooling function and a heating function, the present embodiment will be described on an assumption that the cooling function is used.

When the air-conditioning control device 1 is realized by the server device, for example, the vehicle and the server device are connected by a network including an internet network, a mobile phone network, and the like. Then, the server device serving as the air-conditioning control device 1, remotely controls the air conditioner of the vehicle by communicating via a communication unit (Data Communication Module: DCM) of the vehicle.

Figure 1:
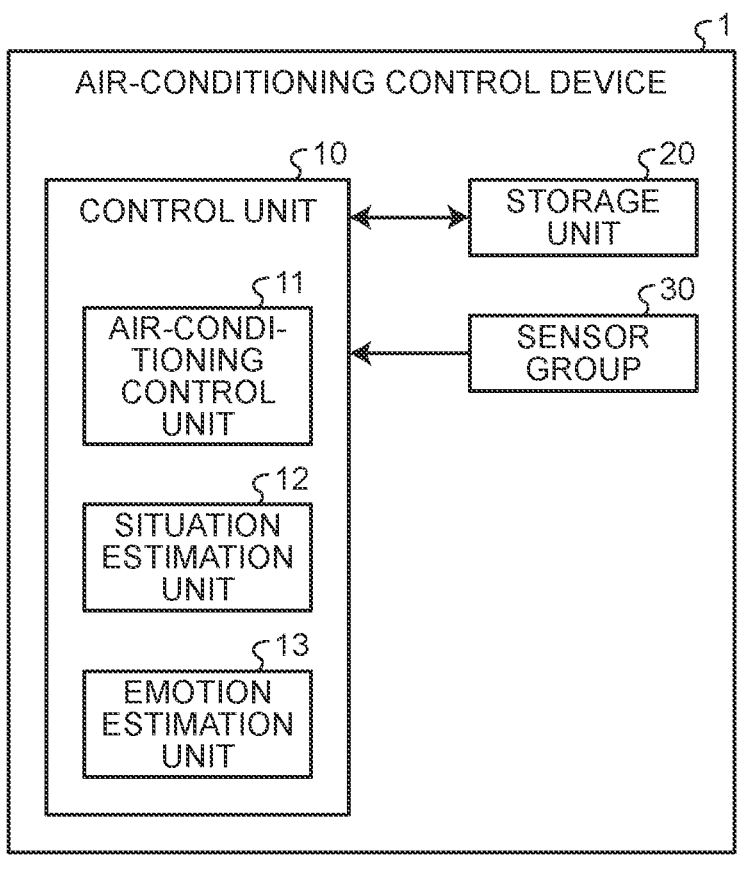
FIG. 1 is a block diagram illustrating a schematic configuration of an air-conditioning control device according to an embodiment.

As illustrated in FIG. 1, the air-conditioning control device 1 includes a control unit 10, a storage unit 20, and a sensor group 30. The control unit 10 includes a processor and a memory (main storage unit). Specifically, the processor includes a Central Processing Unit (CPU), a Digital Signal Processor (DSP), a Field-Programmable Gate Array (FPGA), a Graphics Processing Unit (GPU), and the like. The memory includes a Random Access Memory (RAM), a Read Only Memory (ROM), and the like.

The control unit 10 loads a program stored in the storage unit 20 into a work area of the main storage unit and executes the program, and controls each component and the like through execution of the program, thereby realizing a function that matches a predetermined purpose. The control unit 10 functions as an air-conditioning control unit 11, a situation estimation unit 12, and an emotion estimation unit 13 through execution of the program stored in the storage unit 20.

When a predetermined spot air-conditioning condition is satisfied, the air-conditioning control unit 11 performs spot air-conditioning on the occupant of the vehicle. Note that the spot air conditioning indicates that cool air is locally sent to the corresponding occupant. The spot air-conditioning conditions include, for example, a temperature in the vehicle interior.

Figure 2:
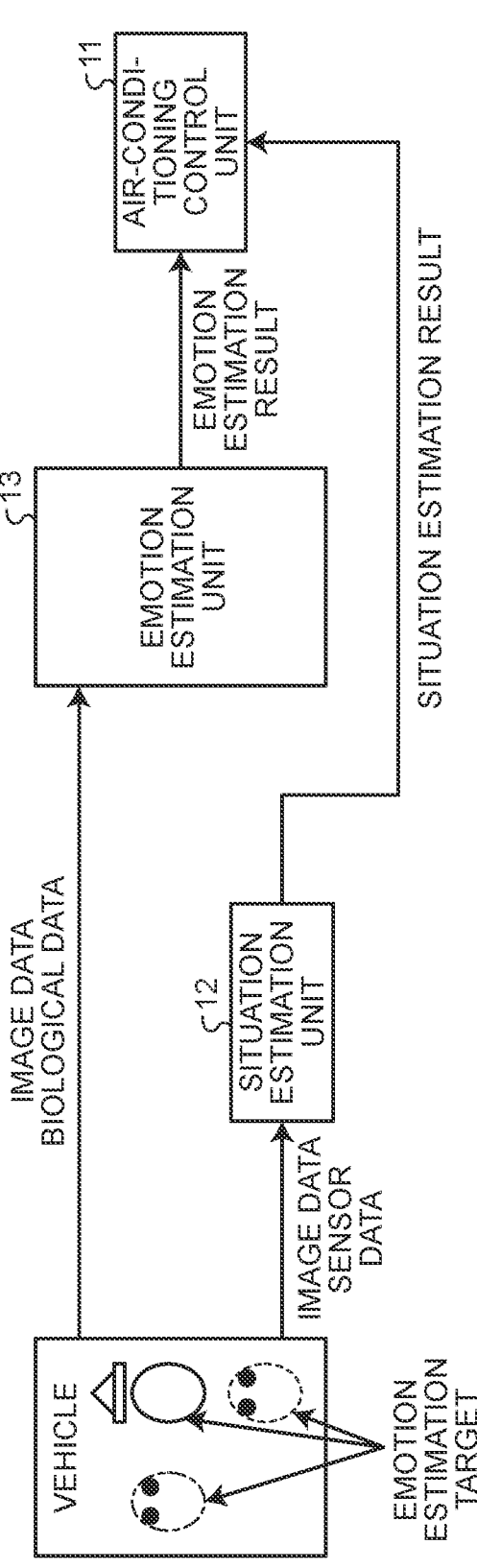
FIG. 2 is a diagram illustrating a flow of information in each unit of the air-conditioning control device according to the embodiment.

The air-conditioning control unit 11 performs the air-conditioning control (first air-conditioning control) of whether or not to perform the spot air-conditioning as described above, and the air-conditioning control (second air-conditioning control) based on an emotion estimation result by the emotion estimation unit 13 as illustrated in FIG. 2.

When controlling the spot air-conditioning based on the emotion estimation result by the emotion estimation unit 13, the air-conditioning control unit 11 adjusts a parameter of the spot air-conditioning such that the repeatedly obtained emotion estimation result of the occupant varies in a direction of comfort from discomfort. The parameters of the spot air conditioning include, for example, a target of the spot air conditioning, an air volume, a temperature, a wind direction, and the like. In addition, the air-conditioning control unit 11 may control the spot air-conditioning using a situation estimation result by the situation estimation unit 12 in addition to the emotion estimation result by the emotion estimation unit 13.

When the emotion estimation result of "comfort" of the occupant on which the spot air-conditioning is performed is acquired from the emotion estimation unit 13, for example, the air-conditioning control unit 11 performs the air-conditioning control to continue the spot air-conditioning. On the other hand, when the emotion estimation result of "discomfort" of the occupant on which the spot air-conditioning is performed is acquired from the emotion estimation unit 13, for example, the air-conditioning control unit 11 performs the air-conditioning control such as on/off of the spot air-conditioning, switching of the target of the spot air-conditioning, adjustment of the air volume, adjustment of the temperature, adjustment of the wind direction, and the like.

The air-conditioning control unit 11 can perform the above-described air-conditioning control (second air-conditioning control) based on a learned model learned in advance by machine learning or on a predetermined rule. When the learned model is used, for example, a numerical value (probability) of comfort and discomfort of the occupant estimated by the emotion estimation unit 13 is used as input data. As the input data, the situation estimation result (the following situations (1) to (9)) by the situation estimation unit 12 may be further used. Output data is, for example, an on-off timing of the spot air conditioning, a switching destination of the target of the spot air conditioning, the air volume of the spot air conditioning, the temperature of the spot air conditioning, the wind direction of the spot air conditioning, and the like. Note that the numerical value of the comfort and discomfort indicates a numerical index indicating, for example, comfort or discomfort. Also, the probability of the comfort and discomfort indicates a probability of a specific emotion indicating comfort or discomfort.

A method for constructing the learned model used in the air-conditioning control unit 11 is not particularly limited, and various machine learning methods such as deep learning using a neural network, a support vector machine, a decision tree, a simple Bayes, and a k neighborhood method can be used.

The situation estimation unit 12 estimates various situations (states or conditions) related to the occupant or the vehicle. A situation (state or condition) to be estimated by the situation estimation unit 12 includes a situation (state or condition) of the occupant, a situation (state or condition) of the passenger compartment, a situation (state or condition) around the occupant, and the like.

As illustrated in FIG. 2, the situation estimation unit 12 acquires image data of the occupant from, for example, a camera of the sensor group 30. Then, the situation estimation unit 12 estimates the situation of the occupant based on the acquired image data. In this case, the situation of the occupant to be estimated by the situation estimation unit 12 is, for example, as follows.

(1) A degree of a facial shine of the occupant due to perspiration, moisture, or the like;

(2) how the occupant's head hair is gathered due to perspiration, moisture, or the like;

(3) whether or not the occupant's front hair is caught in the eye;

(4) whether or not the occupant's body, clothing, shoes, or the like is wet with rain; and (5) material for the occupant's clothing, shoes, or the like.

The situation estimation unit 12 acquires image data of the vehicle interior from the camera of the sensor group 30, for example, as illustrated in FIG. 2. Then, the situation estimation unit 12 estimates the situation of the passenger compartment based on the acquired image data. In this case, the situation of the passenger compartment to be estimated by the situation estimation unit 12 is, for example, as follows.

(6) A presence or absence of a portion where direct sunlight is shining in the passenger compartment and its position; and (7) a presence or absence of a portion which is overheated in the passenger compartment and its position.

The situation estimation unit 12 acquires sensor data in the passenger compartment from, for example, an infrared sensor of the sensor group 30, as illustrated in FIG. 2. Then, the situation estimation unit 12 estimates the situation of the passenger compartment based on the acquired sensor data. In this case, the situation of the passenger compartment to be estimated by the situation estimation unit 12 includes (7) described above, for example.

Further, as illustrated in FIG. 2, the situation estimation unit 12 acquires sensor data of the surroundings of the vehicle from, for example, an in-vehicle sensor of the sensor group 30. Then, the situation estimation unit 12 estimates the situation around the occupant based on the acquired sensor data. In this case, the situation around the occupant to be estimated by the situation estimation unit 12 is, for example, as follows.

(8) Whether or not the surrounding atmosphere is dry; and (9) an ambient air temperature.

The state estimation unit 12 can perform an estimation of the situation described above on the basis of the learned model previously learned by machine learning. When the learned model is used, for example, image data of the occupant, image data of the vehicle interior, sensor data of the vehicle interior, and sensor data of the surroundings of the vehicle are used as input data. Output data is, for example, the situations of (1) to (9) described above.

The method for constructing the learned model used in the situation estimation unit 12 is not particularly limited, and various machine learning methods such as deep learning using a neural network, a support vector machine, a decision tree, a simple Bayes, and a k neighborhood method can be used.

The emotion estimation unit 13 estimates the emotion of the occupant when the spot air conditioning is performed on the occupant in the vehicle interior. The emotion estimation unit 13 estimates the emotion of the occupant based on the sensor data (image data, biological data) acquired from the sensor group 30 that observes the state of the occupant. The emotion estimation unit 13 estimates the emotion of the occupant from the acquired sensor data using the trained machine learning model. Further, the emotion estimation unit 13 may estimate the emotion of the occupant by further using the situation estimation result of the situation estimation unit 12 in addition to the detection data (image data, biometric data) by the sensor group 30. The emotion of the occupant to be estimated by the emotion estimation unit 13 specifically indicates a numerical value (probability) of the comfort and discomfort of the occupant. Further, the estimation of the emotion of the occupant by the emotion estimation unit 13 is repeatedly executed at predetermined control cycles.

As illustrated in FIG. 2, the emotion estimation unit 13 acquires image data of an occupant from, for example, a camera of the sensor group 30. Then, the emotion estimation unit 13 estimates the emotion of the occupant based on the acquired image data. In this case, the emotion estimation unit 13 calculates a numerical value (probability) of the comfort and discomfort of the occupant based on, for example, the expression of the occupant included in the image data.

As illustrated in FIG. 2, the emotion estimation unit 13 acquires biometric data of an occupant from, for example, a biometric sensor of the sensor group 30. Then, the emotion estimation unit 13 estimates the emotion of the occupant based on the acquired biometric data. In this case, the emotion estimation unit 13 calculates a numerical value (probability) of the comfort and discomfort of the occupant based on, for example, a body temperature, a heartbeat, a pulse, a blood pressure, an electroencephalogram, and the like of the occupant included in the biological data.

As illustrated in FIG. 2, the emotion estimation unit 13 may estimate the emotion of the occupant based on both of the detection data (image data, biological data) by the sensor group 30 and the situation estimation result by the situation estimation unit 12.

The emotion estimation unit 13 can perform the above-described emotion estimation based on the learned model learned in advance by machine learning. When the learned model is used, for example, image data of an occupant or biometric data of an occupant is as input data. As the input data, the situation estimation result (the situation of (1) to (9)) by the situation estimation unit 12 may be further used. Output data is, for example, a numerical value (probability) of the comfort and discomfort of the occupant.

The method for constructing the learned model used in the emotion estimation unit 13 is not particularly limited, and various machine learning methods such as deep learning using a neural network, a support vector machine, a decision tree, a simple Bayes, and a k neighborhood method can be used.

The storage unit 20 is realized by a recording medium such as an Erasable Programmable ROM (EPROM), a Hard Disk Drive (HDD), and a removable medium. Examples of the removable medium include disc recording media such as an Universal Serial Bus (USB) a memory, a Compact Disc (CD), a Digital Versatile Disc (DVD), a Blu-ray (registered trademark) Disc (BD).

The storage unit 20 can store an Operating System (OS), various programs, various tables, various databases, and the like. Further, the storage unit 20 may store, for example, estimation results of the situation estimation unit 12 and the emotion estimation unit 13. Further, the storage unit 20 may store a machine-learned model (learned model) and the like used in the air-conditioning control unit 11, the situation estimation unit 12, and the emotion estimation unit 13.

The sensor group 30 acquires data for estimating the situation of the occupant himself/herself, the situation inside the passenger compartment, and the situation around the occupant. The sensor group 30 is installed in, for example, the vehicle interior. Examples of the sensor group 30 include a camera for capturing images of the occupant and the vehicle interior, a temperature sensor and an infrared sensor for detecting conditions in the occupant and the vehicle interior, a biological sensor for acquiring biological data of the occupant, and an in-vehicle sensor for detecting conditions around the vehicle. As the biological sensor, for example, a temperature sensor, a heart rate sensor, a pulse sensor, a blood pressure sensor, an EEG sensor, and the like.

Examples of the in-vehicle sensor include a thermal sensor, a millimeter-wave sensor, an infra-red sensor, a laser sensor, and a 3D-LiDAR.

Note that, in the sensor group 30, the sensor used for emotion estimation and the sensor for estimating the situation in the vehicle interior to determine whether the spot air conditioning is on or off may be the same, partially overlapping, or completely separate.

Air-Conditioning Control Method

Figure 3:
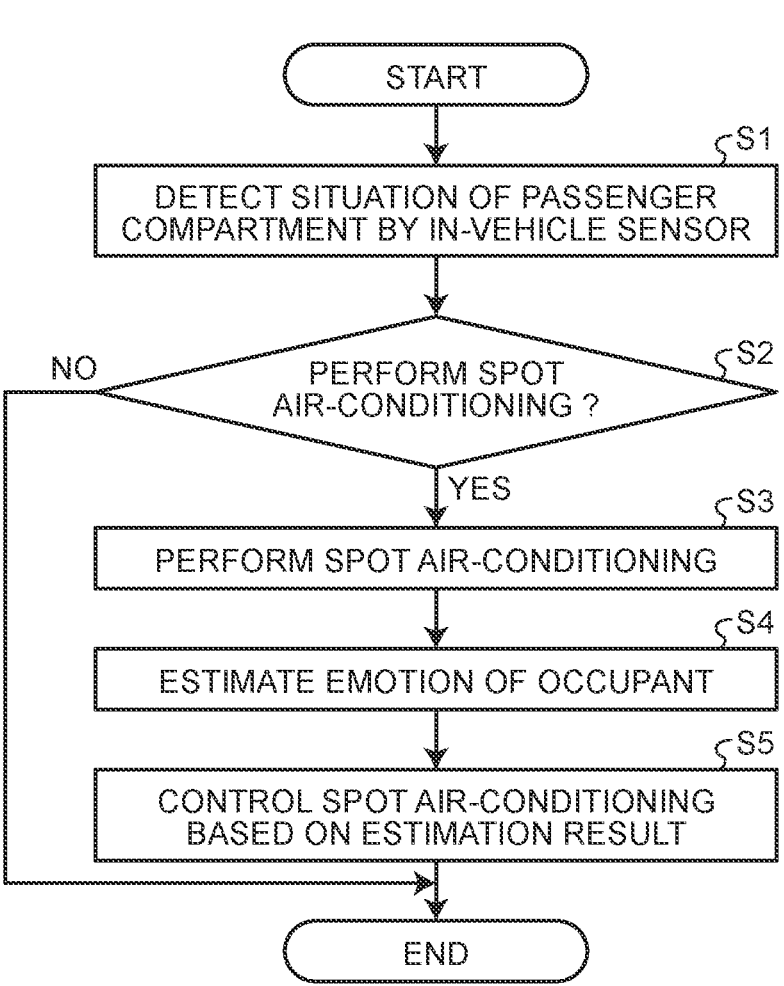
FIG. 3 is a flowchart illustrating an example of a processing procedure of an air-conditioning control method executed by the air-conditioning control device according to the embodiment.

An example of a processing procedure of an air-conditioning control method executed by the air-conditioning control device according to the embodiment will be described with reference to FIG. 3.

First, the situation of the passenger compartment is detected using the in-vehicle sensor of the sensor group 30 (step S1). Subsequently, the air-conditioning control unit 11 determines whether or not to perform spot air-conditioning on the basis of sensor data of the in-vehicle sensor and a predetermined spot air-conditioning condition (step S2).

When it is determined in step S2 that the spot air-conditioning is to be performed (Yes in step S2), the air-conditioning control unit 11 performs the spot air-conditioning on the corresponding occupant (step S3). Subsequently, the emotion estimation unit 13 estimates the emotion of the occupant on the basis of the detected data (the image data and the biometric data) by the sensor group 30 (step S4).

Subsequently, the air-conditioning control unit 11 controls the spot air-conditioning based on the estimation result by the emotion estimation unit 13 (step S5), and completes the present process. If it is determined in the step S2 that the spot air-conditioning is not to be performed (No in the step S2), the air-conditioning control unit 11 completes this process.

According to the air-conditioning control device and the air-conditioning control program according to the embodiment described above, it is possible to perform the air-conditioning control reflecting the feeling of the occupant by estimating whether or not the spot air-conditioning is comfortable for the occupant and by controlling the spot air-conditioning based on the estimation result.

In addition, in the air-conditioning control device and the air-conditioning control program according to the embodiment, since the air-conditioning control reflecting the feeling of the occupant can be performed, the comfort of the occupant is improved. In addition, since a setting operation of the air conditioning is reduced, the occupant can concentrate on a driving, and a driving safety is improved.

According to the present disclosure, it is possible to perform air-conditioning control that reflects how the occupant feels by estimating whether the spot air-conditioning is comfortable for the occupant and controlling the spot air-conditioning based on the estimation result.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air-conditioning control device comprising a processor comprising hardware, the processor being configured to execute:

estimating an emotion of an occupant in a vehicle interior when a spot air conditioning is performed on the occupant;

controlling the spot air conditioning based on an estimation result using a machine learning model, the machine learning model is trained to receive a numerical value indicating the estimated emotion of the occupant as input, and to output an on-off timing of the spot air conditioning, a switching destination of a target of the spot air conditioning, a temperature of the spot air conditioning, or a wind direction of the spot air conditioning;

acquiring sensor data from a sensor installed in the vehicle interior; and estimating at least one of a situation of the occupant, a situation of a passenger compartment, or a situation around the occupant from the acquired sensor data to acquire a situation estimation result of the at least one of the situation of the occupant, the situation of the passenger compartment, or the situation around the occupant;

wherein the input to the machine learning model further includes the situation estimation result.

2. The air-conditioning control device according to claim 1, wherein the estimating of the emotion of the occupant includes detecting a state of the occupant from the acquired sensor data, and estimating the emotion of the occupant from the acquired sensor data using the machine learning model.

3. The air-conditioning control device according to claim 2, wherein the sensor includes a camera installed in the vehicle interior, and the sensor data includes image data obtained by the camera.

4. The air-conditioning control device according to claim 3, wherein the estimating of the emotion of the occupant is based on an expression of the occupant included in the image data.

5. The air-conditioning control device according to claim 2, wherein the sensor includes a biometric sensor installed in the vehicle interior, and the sensor data includes biometric data obtained by the biometric sensor.

6. The air-conditioning control device according to claim 5, wherein the estimating of the emotion of the occupant is based on a body temperature, a heartbeat, a pulse, a blood pressure, or an electroencephalogram of the occupant included in the biometric data.

7. The air-conditioning control device according to claim 2, wherein the sensor includes a camera and a biometric sensor that are installed in the vehicle interior, and the sensor data includes image data obtained by the camera and biometric data obtained by the biometric sensor.

8. The air-conditioning control device according to claim 7, wherein the estimating of the emotion of the occupant is based on an expression of the occupant included in the image data and on a body temperature, a heartbeat, a pulse, a blood pressure, or an electroencephalogram of the occupant included in the biometric data.

9. The air-conditioning control device according to claim 1, wherein the estimating of the emotion of the occupant is repeatedly executed, and the controlling of the spot air-conditioning based on the estimation result includes adjusting a parameter of the spot air-conditioning such that a repeatedly obtained estimation result of the emotion of the occupant varies in a direction of comfort from discomfort.

10. The air-conditioning control device according to claim 9, wherein the parameter of the spot air-conditioning includes a target of the spot air conditioning, an air volume, a temperature, or a wind direction.

11. The air-conditioning control device according to claim 1, wherein the estimating of the at least one of the situation of the occupant, the situation of the passenger compartment, or the situation around the occupant is performed using the machine learning model to which the acquired sensor data is input as input data and from which the at least one of the situation of the occupant, the situation of the passenger compartment, or the situation around the occupant is output as output data.

12. The air-conditioning control device according to claim 1, wherein:

the sensor data includes image data of the occupant;

the processor is configured to execute estimating the situation of the occupant based on the image data of the occupant; and the input to the machine learning model includes an estimation result of the situation of the occupant as the situation estimation result.

13. The air-conditioning control device according to claim 12, wherein the situation of the occupant is at least one of:

a degree of a facial shine of the occupant due to perspiration or moisture;

how a heard hair of the occupant is gathered due to perspiration or moisture;

whether or not a front hair of the occupant is caught in an eye of the occupant;

whether or not a body, clothing, or shoes of the occupant is wet with rain; and material for a clothing of shoes of the occupant.

14. The air-conditioning control device according to claim 1, wherein:

the sensor data includes image data of the vehicle interior;

the processor is configured to execute estimating the situation of the passenger compartment based on the image data of the vehicle interior; and the input to the machine learning model includes an estimation result of the situation of the passenger compartment as the situation estimation result.

15. The air-conditioning control device according to claim 14, wherein:

the situation of the passenger compartment is at least one of:

a presence or absence of a portion where direct sunlight is shining in the passenger compartment and its position; and a presence or absence of a portion which is overheated in the passenger compartment and its position.

16. The air-conditioning control device according to claim 1, wherein:

the sensor data includes sensor data of surroundings of the vehicle;

the processor is configured to execute estimating the situation around the occupant based on the sensor data of the surroundings of the vehicle; and the input to the machine learning model includes an estimation result of the situation around the occupant as the situation estimation result.

17. The air-conditioning control device according to claim 16, wherein the situation around the occupant is at least one of:

whether or not surrounding atmosphere of the occupant is dry; and an ambient air temperature of the occupant.

18. A non-transitory computer-readable recording medium with an executable program stored thereon, the program causing a processor to execute:

estimating an emotion of an occupant in a vehicle interior when a spot air conditioning is performed on the occupant;

controlling the spot air conditioning based on an estimation result using a machine learning model, the machine learning model is trained to receive a numerical value indicating the estimated emotion of the occupant as input, and to output an on-off timing of the spot air conditioning, a switching destination of a target of the spot air conditioning, a temperature of the spot air conditioning, or a wind direction of the spot air conditioning;

acquiring sensor data from a sensor installed in the vehicle interior; and estimating at least one of a situation of the occupant, a situation of a passenger compartment, or a situation around the occupant from the acquired sensor data to acquire a situation estimation result of the at least one of the situation of the occupant, the situation of the passenger compartment, or the situation around the occupant;

wherein the input to the machine learning model further includes the situation estimation result.

* * * * *